US005588991A

United States Patent [19]
Hongo et al.

[11] Patent Number: 5,588,991
[45] Date of Patent: Dec. 31, 1996

[54] PROCESS FOR PRODUCING CHLOROGALLIUM PHTHALOCYANINE CRYSTAL

[75] Inventors: Kazuya Hongo; Hitoshi Takimoto, both of Minami Ashigara, Japan

[73] Assignee: Fuji Xerox Co., Ltd., Tokyo, Japan

[21] Appl. No.: 521,042

[22] Filed: Aug. 29, 1995

[30] Foreign Application Priority Data

Aug. 31, 1994 [JP] Japan .................................. 6-229063
Feb. 21, 1995 [JP] Japan .................................. 7-055234

[51] Int. Cl.$^6$ .................................................. C30B 3/00
[52] U.S. Cl. ........................................ 117/2; 117/3; 430/76
[58] Field of Search .......................... 117/2, 3, 5; 430/76, 430/78

[56] References Cited

U.S. PATENT DOCUMENTS

| | | | |
|---|---|---|---|
| 2,770,629 | 11/1956 | Eastes | 540/141 |
| 3,160,635 | 12/1964 | Knudsen et al. | 540/141 |
| 3,160,653 | 12/1964 | Benning et al. | 558/425 |
| 3,357,989 | 12/1967 | Byrne et al. | 540/122 |
| 3,708,292 | 11/1973 | Brach et al. | 430/78 |
| 5,358,813 | 10/1994 | Iijima et al. | 430/59 |
| 5,393,629 | 2/1995 | Nukada et al. | 430/76 |
| 5,449,581 | 9/1995 | Matsui et al. | 430/59 |
| 5,459,004 | 10/1995 | Katsumi et al. | 430/78 |

FOREIGN PATENT DOCUMENTS

| | | |
|---|---|---|
| 48-34189 | 5/1973 | Japan . |
| 49-105536 | 10/1974 | Japan . |
| 57-148745 | 9/1982 | Japan . |
| 58-21416 | 2/1983 | Japan . |
| 59-44053 | 3/1984 | Japan . |
| 61-151659 | 7/1986 | Japan . |
| 1-221459 | 9/1989 | Japan . |
| 2-87154 | 3/1990 | Japan . |
| 5-98181 | 4/1993 | Japan . |
| 0598181 | 4/1993 | Japan . |
| 5194523 | 8/1993 | Japan . |
| 5-194523 | 8/1993 | Japan . |

OTHER PUBLICATIONS

"Electrophotographic Photoreceptors With High Sensitivity In Near Infrared Region Using Phthalocyanine Compounds:" Koichi Arishima et al.; Shingaku Giho CPM 81–69, vol. 81, No. 181, Nov. 27, 1981 pp. 39–45.

"Photoconduction of Metal Phthalocyanine (III)—Rectification Properties of Gallium Phthalocyanine;" Toyohide Tanaka et al.; Denshi Shashin Gakkai Shi, 26(3); 1987; pp. 240–244.

Primary Examiner—Nam Nguyen
Assistant Examiner—Felisa Garrett
Attorney, Agent, or Firm—Oliff & Berridge

[57] ABSTRACT

In a process for producing a chlorogallium phthalocyanine crystal comprising mechanically dry-grinding chlorogallium phthalocyanine and subjected to crystal conversion, the weight ratio of chlorogallium phthalocyanine to the grinding media is set at a range of from 1/5 to 1/1000. The resulting chlorogallium phthalocyanine crystal excels in the dispersibility in a binding resin and the stability in the dispersion.

5 Claims, 1 Drawing Sheet

PROCESS FOR PRODUCING CHLOROGALLIUM PHTHALOCYANINE CRYSTAL

FIELD OF THE INVENTION

This invention relates to a process for producing a chlorogallium phthalocyanine crystal by crystal conversion.

BACKGROUND OF THE INVENTION

Conventionally, various inorganic and organic photoconductive substances have been known as a photoconductive substance in an electrophotographic photoreceptor. Since organic photoconductive substances, when being used as an electrophotograph, have advantages of having excellent transparency of the film, good film-forming ability and flexibility, and reduced cost, various substances have hitherto been suggested. In recent years, there is an increasing requirement that a photosensitive wavelength region of the conventionally suggested organic photoconductive substance extends to the wavelength of an infrared semiconductor laser to use the substance as a photoreceptor for digital recording such as for a laser printer. From this viewpoint, squaralilium compounds described in JP-A-49-105536 (the term "JP-A" as used herein means an unexamined published Japanese patent publication) and JP-A-58-21416, triphenylamine trisazo compounds described in JP-A-61-151659, phthalocyanine compounds described in JP-A-48-34189 and JP-A-57-148745 have been suggested as photoconductive materials for a semiconductor laser.

When organic photoconductive substances are used as a photoreceptor for a semiconductor laser, it is required first that they have a photosensitive region extending to a long wavelength and then that the photosensitive products formed have excellent sensitivity and durability.

In order to satisfy these requirements, intense investigation and development have been tried and particularly, with regard to phthalocyanine compounds, various reports about their crystal forms and electronically photographic characteristics have been made.

In general, it has been known that phthalocyanine compounds have several crystal forms depending on the difference of the treating processes and the differences of the crystal forms have a great influence upon the photoelectric transfer characteristics of the phthalocyanine compounds. As for the crystal forms of the phthalocyanine compounds, for example, concerning copper phthalocyanine, in addition to β form which is a stable form, crystal forms such as α, ε, π, χ, ρ, γ, and δ forms have been known. These crystal forms have been known to be able to cause mutual transition by mechanical deformation power, treatment with sulfuric acid, treatment with an organic solvent, thermal treatment, and other treatments (e.g., see U.S. Pat. Nos. 2,770,629, 3,160, 635, 3,708,292, and 3,357,989). As for non-metallic phthalocyanine, crystal forms such as α, β, γ, and χ have been known.

Moreover, with regard to chlorogallium phthalocyanine, the crystal form of chlorogallium phthalocyanine having a diffractive peak at a specific Bragg angle has been described in Denshi Shasin Gakkai Shi, 26 (3), pp. 240 (1987), but it has a crystal form different from that of the invention, and there is no description of the application to an electrophotograph in this literature. On the other hand, JP-A-59-44053 and Shingaku Giho CPM 81-69, 39 (1981) report the application to an electrophotograph, and JP-A-1-221459 discloses a chlorogallium phthalocyanine having a diffractive peak at a specific Bragg's angle and an electrophotographic photoreceptor using the same.

However, the conventionally suggested phthalocyanines do not necessarily have a sufficient photosensitivity, and have problems in terms of dispersibility in a binding resin and stability of the dispersion, and are disadvantageous in that they tend to cause image defects such as fogging and black spots. For these reasons, further improvement has been desired.

The present invention has been done according to these requirements, and an object of the present invention is to solve the prior art's problems.

To be specific, the object of the present invention is to provide a process for producing a chlorogallium phthalocyanine crystal having a high sensitivity, excellent electrophotographic characteristics, and excellent dispersibility in a binding resin and stability of dispersion.

SUMMARY OF THE INVENTION

As a result of our intense studies, it has been found that when chlorogallium phthalocyanine obtained by synthesis is dry-ground (dry-pulverized) and subjected to crystal conversion, the weight ratio of chlorogallium phthalocyanine to the grinding media is set at a range of from 1/5 to 1/1000, thereby obtaining a chlorogallium phthalocyanine crystal having a high sensitivity and excellent durability as a photoconductive material, and that when this chlorogallium phthalocyanine crystal is used as a charge generating material, the object of the present invention can be achieved, thereby completing the present invention.

The process for producing a chlorogallium phthalocyanine crystal of the present invention is characterized in that when chlorogallium phthalocyanine is mechanically dry-ground with a grinding media and subjected to crystal conversion, the weight ratio of chlorogallium phthalocyanine to the grinding media is set at a range of from 1/5 to 1/1000.

DETAILED DESCRIPTION OF THE INVENTION

Figure 1:
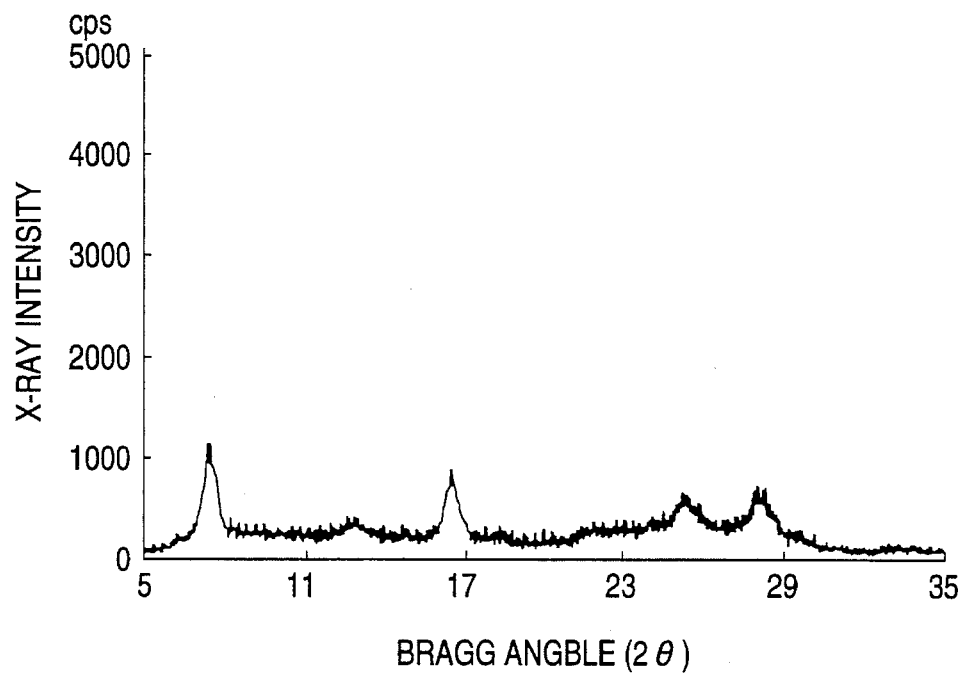
FIG. 1 shows a powder X-ray diffractive pattern of chlorogallium phthalocyanine crystal obtained in Example 1.

The present invention will be described below in detail.

The chlorogallium phthalocyanine which is used as a raw material in the present invention can be produced by any of the known synthetic processes such as a phthalonitrile process in which phthalonitrile or diiminoisoindoline and a metal chloride are thermally melted or heated in the presence of an organic solvent; a Wyler process in which phthalic anhydride, urea and a metal chloride are thermally melted or heated in the presence of an organic solvent; a process in which cyanobenzamide and a metal salt are reacted at a high temperature; and a process in which dilithium phthalocyanine and a metal salt are reacted, and by these synthetic processes, chlorogallium phthalocyanine (a) having intense peaks at least at 11.0°, 13.5° and 27.1° of the Bragg angle relative to Cu-Kα character X ray (2θ±0.2°) is produced. As the organic solvents which are used in these synthetic processes, high boiling point solvents which are inert under the reaction such as α-chloronaphthalene, β-chloronaphthalene, methoxynaphthalene, diphenylethane, ethylene glycol, dialkyl ethers, quinoline, sulfolane, dimethylsulfoxide, dichlorobenzene, and dichlorotoluene are desirable.

Chlorogallium phthalocyanine (a) obtained by any of these synthetic processes is mechanically dry-ground according to the present invention. Using a grinder for fine grinding by incorporating grinding media in the interior of vessel such as of a vibration mill, a planetary ball mill, a sand mill, a dino mill, a sueco mill, an attritor, and a ball mill, chlorogallium phthalocyanine (a) is dry-ground setting the weight ratio of chlorogallium phthalocyanine to the grinding media at a range of from 1/5 to 1/1000. The period of pulverization may be from 1 to 300 hours, whereby the crystal conversion can be performed to obtain an intended chlorogallium phthalocyanine crystal.

A vibration mill is the most effective grinder of the above-mentioned grinders and can provide a high grinding efficiency. As the raw material for the grinding media, any known materials such as glass, alumina, zirconia, steel, stainless steel, carbon steel, chromium steel, silicon nitride, nylon, and polyurethane can be used. The shape of the grinding media which can be used is a known shape such as a globular, rod, or cylindrical form.

The weight ratio of chlorogallium phthalocyanine to the grinding media is required to be from 1/5 to 1/1000, and is preferably from 1/10 to 1/1000. If the weight ratio of chlorogallium phthalocyanine to the grinding media is more than 1/5, the grinding efficiency is decreased, which needs a very long period for grinding and, thus, this is not preferred in terms of production efficiency. Moreover, even when the grinding period is extended, the fine grinding cannot be performed any longer and, since particles having a small particle size cannot be obtained, a material having a high sensitivity cannot be obtained. Conversely, if the weight ratio is less than 1/1000, the recovery of the crystal-converted chlorogallium phthalocyanine crystal is decreased and, at the same time, since the staining due to the wearing of the grinding media is increased, the image quality is adversely affected.

The thus crystal-converted chlorogallium phthalocyanine crystal preferably has an average particle size of not more than 0.20 μm, and particularly from 0.01 to 0.20 μm, by adjusting the grinding period. If the average particle size exceeds 0.20 μm, the sensitivity of the resulting material is insufficient and the dispersibility is decreased and, thus, image defects tend to be caused.

The chlorogallium phthalocyanine crystal which has been crystal-converted by the process of the present invention has main diffractive peaks at least at 7.5°, 16.7°, 25.6° and 28.4° of the Bragg angle relative to Cu-Kα character X ray (2θ±0.2°), the half band width at a peak of the Bragg angle of 7.5° is not less than 0.35, and the peak intensity ratio of the peak of the Bragg angle of 28.4° to the peak of the Bragg angle of 7.5° is from 0.4 to 0.7.

An embodiment where the chlorogallium phthalocyanine crystal obtained by the process of the present invention is used as a photoconductive material in an electrophotographic photoreceptor will be described below.

As the photoconductive materials in an electrophotographic photoreceptor, those whose photosensitive layer has a single layer construction or whose photosensitive layer has a laminated construction where a charge generating layer and a charge transport layer are separately provided as their functions may be applied.

As the electroconductive substrate in the electrophotographic photoreceptor, any substrate may be used as long as it has been conventionally used. If required, the surface of the electroconductive substrate may be treated in various manners to the extent that there is no influence on the image quality. For example, an anodic oxidation of the surface, a surface coarsening treatment by liquid honing, a chemical treatment, or a coloring treatment can be carried out.

In the case of the laminated type photoreceptor, a photosensitive layer in which at least a charge generating layer and a charge transport layer are laminated may be provided on an electroconductive substrate, and as for the order of the lamination, either layer may be near the substrate.

The charge generating layer may be composed of the chlorogallium phthalocyanine crystal obtained by the process of the present invention and a predetermined binding resin. In this case, no binding resin may be used. In addition to the chlorogallium phthalocyanine crystal, other known charge generating materials may be used together.

Any known binding resin can be used as the binding resin. The compounding weight ratio of the charge generating material to the binding resin is preferably from 40:1 to 1:4, and more preferably from 20:1 to 1:2. If the ratio of the charge generating material is too high, the stability of the coating liquid is decreased, and conversely, if it is to low, the sensitivity of the resulting material is lowered. For these reasons, the above-mentioned range is preferable.

As the solvents which can be used in the dispersion, organic solvents such as methanol, ethanol, n-butanol, benzyl alcohol, methyl Cellosolve, ethyl Cellosolve, acetone, methyl ethyl ketone, cyclohexanone, methyl acetate, ethyl acetate, n-butyl acetate, dioxane, tetrahydrofuran, methylene chloride, chloroform, benzene, toluene, xylene, chlorobenzene, dimethylformamide, and dimethyl acetamide, and the mixed solvents thereof can be used. As means for dispersing, a method using a sand mill, a colloid mill, an attritor, a ball mill, a dino mill, a co-ball mill, and a roll mill can be used. As the coating process, methods such as a blade coating, a wire bar coating, a spray coating, a dip coating, a bead coating, and a curtain coating, can be utilized.

The film thickness of the charge generating layer is preferably from 0.01 to 5 μm, and more preferably from about 0.03 to 2 μm.

The charge transport layer may be composed of a charge transport material and a film-forming resin, and any known material can be used. Examples of the film-forming resin include polycarbonates, polyallylates, polystyrenes, polyesters, styrene-acrylonitrile copolymers, polysulfones, polymethacrylates, styrene-methacrylate copolymers, polyolefins, etc. Of these, polycarbonates are suitable in terms of durability.

The compounding weight ratio of the charge transport material to the film-forming resin is preferably from 5:1 to 1:5, and more preferably from 3:1 to 1:3. If the ratio of the charge material is too high, the mechanical strength of the charge transport layer is decreased and, conversely, if it is too low, the sensitivity is lowered. For these reasons, the above-mentioned range is preferable. If the charge transport material has a film-forming ability, the film forming resin can be omitted.

The charge transport material layer is formed by dissolving the charge transport material and the film-forming resin in an appropriate solvent, followed by application, and it is preferable to form the layer in such a manner that the film thickness preferably becomes in the range of from 5 to 50 μm, and more preferably from 10 to 40 μm.

As the methods for applying the photosensitive layer, any of the methods described in the charge generating layer can be used.

When the photosensitive layer has a single layer construction, the photosensitive layer is composed of a photoconductive layer having the chlorogallium phthalocyanine crystal and the charge transport material dissolved in the film forming resin. As the charge transport material, any known material can be used, and as the film forming resin, a material similar to those described above is used. The photosensitive layer is formed by any of the above-mentioned methods. It is preferable to set the compounding weight ratio of the charge transport material to the film forming resin at the range from 1:20 to 5:1, and the compounding weight ratio of the chlorogallium phthalocyanine crystal to the charge transport material at the range from 1:10 to 10:1.

If necessary, an undercoat layer may be provided between the photosensitive material and the substrate. The undercoat layer is effective for preventing the injection of unnecessary electric charge from the substrate, and has a function of enhancing charging properties. Also, it has a function of enhancing the adhesion between the photosensitive layer and the substrate.

In addition, in order to improve printing resistance, a protective layer (i.e., overcoat layer) may be provided on the photosensitive layer.

The resulting electrophotographic photoreceptors can be effectively used in an electrophotographic copying machine, and it is also applicable to a laser beam printer, an LED printer, a CRT printer, a microfilm reader, a normal paper facsimile, and an electrophotographic printing system.

The chlorogallium phthalocyanine crystal obtained by the process of the present invention can provide an electrophotographic photoreceptor exhibiting a high sensitivity, excellent electrophotographic characteristics, and excellent dispersibility, and having excellent image quality without fogging and black spots by incorporating it in a photosensitive layer as a charge generating material. Furthermore, since the process for producing a chlorogallium phthalocyanine crystal of the present invention can be carried out in a simple stage and does not require complicated installation, a chlorogallium phthalocyanine crystal having good characteristics can be stably obtained with less impact in terms of cost.

The present invention will now be described in greater detail by referring to Examples. In Examples, the "part" is based on weight.

SYNTHETIC EXAMPLE (SYNTHESIS OF CHLOROGALLIUM PHTHALOCYANINE)

Figure 2:
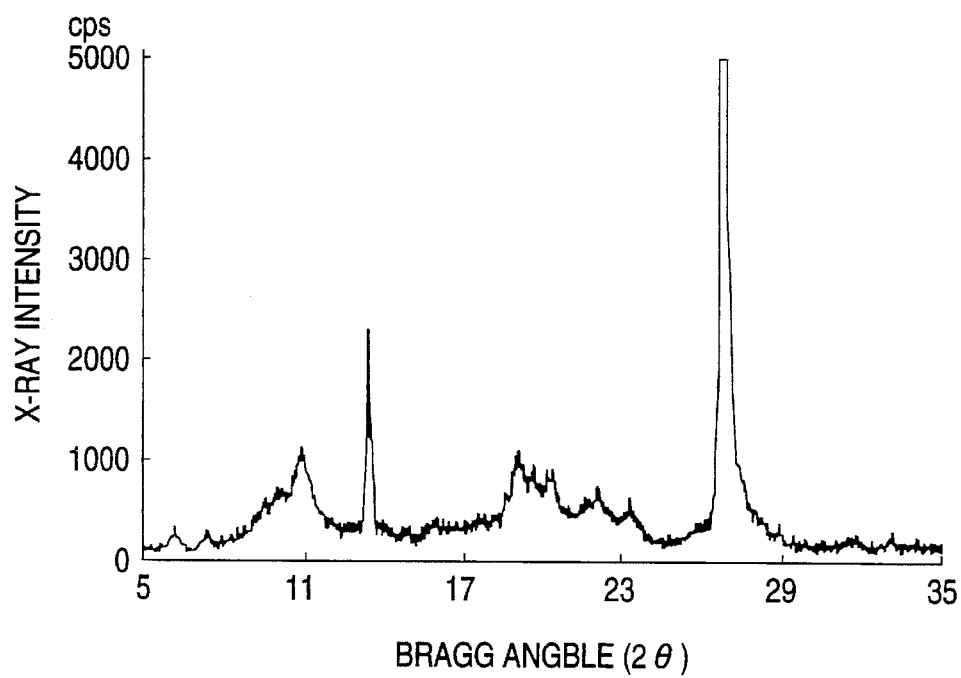
FIG. 2 shows a powder X-ray diffractive pattern of chlorogallium phthalocyanine crystal obtained in Synthetic Example.

In 230 parts of quinoline were put 30 parts of 1.3-diiminoisoindoline and 9.1 parts of gallium trichloride. The mixture was reacted at 180° C. for 4 hours. Thereafter, the product was filtered off, washed with N,N-dimethylformamide and with methanol, and the wet cake was then dried to obtain 28 parts of chlorogallium phthalocyanine. The powder X ray diffraction of the resulting chlorogallium phthalocyanine is shown in FIG. 2. The elemental analysis gave the following data:

|                | C     | H    | N     | Cl   |
|----------------|-------|------|-------|------|
| Calculated (%) | 62.22 | 2.61 | 18.14 | 5.74 |
| Found (%)      | 62.11 | 2.63 | 18.00 | 5.70 |

When the average particle size of the chlorogallium phthalocyanine crystal was determined with Laser Scattering Particle Size Distribution Analyzer (LA 700, produced by Horiba Seisakusho), it was found to be 45.0 μm.

EXAMPLE 1

In an alumina-made pot were put 5 parts of the chlorogallium phthalocyanine crystal obtained in Synthetic Example together with 250 parts of an alumina-made ball having a diameter of 15 mm (weight ratio of chlorogallium phthalocyanine crystal to the alumina-made ball: 1/50). The pot was provided on a vibration mill (MB-1, produced by Chuo Kakoki), and the crystal was ground over a period of 100 hours. FIG. 1 shows the powder X ray diffraction pattern of the resulting chlorogallium phthalocyanine crystal.

From the results of the powder X ray diffraction, it was found that the half band width at the peak of a Bragg angle of 7.5° was 0.62, and the peak intensity ratio of the peak of the Bragg angle of 28.4° to the peak of the Bragg angle of 7.5° was 0.46. When the average particle size of the chlorogallium phthalocyanine crystal at that time was determined, it was found to be 0.14 μm.

EXAMPLE 2

In a glass-made ball mill were put 5 parts of the chlorogallium phthalocyanine crystal obtained in Synthetic Example together with 50 parts of an alumina-made ball having a diameter of 15 mm (weight ratio of chlorogallium phthalocyanine crystal to the alumina-made ball: 1/10). The pot was provided on a vibration mill (MB-1, produced by Chuo Kakoki), and the crystal was ground over a period of 100 hours. The powder X ray diffraction pattern of the resulting chlorogallium phthalocyanine crystal was similar to that of Example 1. From the results of the measurement, it was found that the half band width at the peak of a Bragg angle of 7.5° was 0.41, and the peak intensity ratio of the peak of the Bragg angle of 28.4° to the peak of the Bragg angle of 7.5° was 0.43. When the average particle size of the chlorogallium phthalocyanine crystal at that time was determined, it was found to be 0.20 μm.

EXAMPLE 3

In an alumina-made pot were put 5 parts of the chlorogallium phthalocyanine crystal obtained in Synthetic Example together with 350 parts of glass beads having a diameter of 15 mm, set on a ball mill's trestle, and ground over a period of 120 hours (weight ratio of chlorogallium phthalocyanine crystal to the glass beads: 1/70). The powder X ray diffraction of the resulting chlorogallium phthalocyanine crystal was similar to that of Example 1. From the results of the measurement, it was found that the half band width at the peak of a Bragg angle of 7.5° was 0.56, and the peak intensity ratio of the peak of the Bragg angle of 28.4° to the peak of the Bragg angle of 7.5° was 0.49. When the average particle size of the chlorogallium phthalocyanine crystal at that time was determined, it was found to be 0.17 μm.

EXAMPLE 4

In an aluminum-made pot were put 10 parts of the chlorogallium phthalocyanine crystal obtained in Synthetic Example together with 250 parts of an alumina-made ball having a diameter of 15 mm (weight ratio of chlorogallium phthalocyanine crystal to the alumina-made ball: 1/25). The pot was provided on a vibration mill (MB-1, produced by Chuo Kakoki), and the crystal was ground over a period of 100 hours. The powder X ray diffraction pattern of the resulting chlorogallium phthalocyanine crystal was substantially similar to that of Example 1. From the results of the measurement, it was found that the half band width at the peak of a Bragg angle of 7.5° was 0.62, and the peak intensity ratio of the peak of the Bragg angle of 28.4° to the peak of the Bragg angle of 7.5° was 0.46. When the average particle size of the chlorogallium phthalocyanine crystal at that time was determined, it was found to be 0.14 µm.

EXAMPLE 5

In an alumina-made pot were put 5 parts of chlorogallium phthalocyanine crystal obtained in Synthetic Example together with 25 parts of an alumina-made ball having a diameter of 15 mm (weight ratio of chlorogallium phthalocyanine crystal to the alumina-made ball: 1/5). The pot was provided on a vibration mill (MB-1, produced by Chuo Kakoki), and the crystal was ground over a period of 100 hours. The powder X ray diffraction pattern of the resulting chlorogallium phthalocyanine crystal was substantially similar to that of Example 1. From the results of the measurement, it was found that the half band width at the peak of a Bragg angle of 7.5° was 0.41, and the peak intensity ratio of the peak of the Bragg angle of 28.4° to the peak of the Bragg angle of 7.5° was 0.43. When the average particle size of the chlorogallium phthalocyanine crystal at that time was determined, it was found to be 0.20 µm.

EXAMPLE 6

In a glass-made ball mill were put 5 parts of chlorogallium phthalocyanine crystal obtained in Synthetic Example together with 500 parts of glass beads having a diameter of 15 mm, set on a ball mill's trestle, and ground over a period of 120 hours (weight ratio of chlorogallium phthalocyanine crystal to the glass beads: 1/100). The powder X ray diffraction pattern of the resulting chlorogallium phthalocyanine crystal was similar to that of Example 1. From the results of the measurement, it was found that the half band width at the peak of a Bragg angle of 7.5° was 0.56, and the peak intensity ratio of the peak of the Bragg angle of 28.4° to the peak of the Bragg angle of 7.5° was 0.49. When the average particle size of the chlorogallium phthalocyanine crystal at that time was determined, it was found to be 0.17 µm.

COMPARATIVE EXAMPLE 1

In an alumina-made pot were put 5 parts of chlorogallium phthalocyanine crystal obtained in Synthetic Example together with 15 parts of an alumina-made ball having a diameter of 15 mm (weight ratio of chlorogallium phthalocyanine crystal to the alumina-made ball: 1/3). The pot was provided on a vibration mill, and the crystal was ground over a period of 100 hours. At that time, a large amount of cohesion of the chlorogallium phthalocyanine crystal was observed in the pot. From the results of the powder X ray diffraction pattern of the resulting chlorogallium phthalocyanine crystal, it was found that the half band width at the peak of a Bragg angle of 7.5° was 0.26, and the peak intensity ratio of the peak of the Bragg angle of 28.4° to the peak of the Bragg angle of 7.5° was 0.20. When the average particle size of the chlorogallium phthalocyanine crystal at that time was determined, it was found to be 0.29 µm.

COMPARATIVE EXAMPLE 2

In a glass-made ball mill were put 5 parts of chlorogallium phthalocyanine crystal obtained in Synthetic Example together with 20 parts of glass beads having a diameter of 15 mm, set on a ball mill's trestle, and ground over a period of 120 hours (weight ratio of chlorogallium phthalocyanine crystal to the glass beads: 1/4). At that time, a large amount of cohesion of the chlorogallium phthalocyanine crystal was observed in the mill. From the results of the powder X ray diffraction pattern of the resulting chlorogallium phthalocyanine crystal, it was found that the half band width at the peak of a Bragg angle of 7.5° was 0.31, and the peak intensity ratio of the peak of the Bragg angle of 28.4° to the peak of the Bragg angle of 7.5° was 0.32. When the average particle size of the chlorogallium phthalocyanine crystal at that time was determined, it was found to be 0.36 µm.

EXAMPLE 7

As described in JP-A-2-87154, a wet honing treatment of aluminum pipe was carried out as follows as described in JP-A-2-87154. A mirror-surface aluminum pipe having a diameter of 40 mm and a length of 319 mm was prepared. Using a liquid honing apparatus, 10 kg of abrasive (Green Desick GC #400, produced by Showa Denko) was suspended in 40 l of water, and the suspension was transported to a gun at a flow rate of 6 l/min., and a wet-honing was carried out at a blowing rate of 60 mm/min., and at an air pressure of 0.85 kgf/cm$^2$, while moving the aluminum pipe to the axis direction with rotating it at 120 rpm. The center line coarseness, $R_3$, at that time was 0.16 µm. Subsequently, 8 parts of a polyvinyl butyral resin (S-lec BM-S, produced by Sekisui Chemicals) was added to 152 parts of n-butyl alcohol, and dissolved with stirring to prepare a 5% by weight polyvinyl butyral solution. Subsequently, a solution prepared by mixing 100 parts of a 50% solution of tributoxyzirconium acetylacetonate in toluene (ZC 540, Matsushita Trading), 10 parts of γ-aminopropyl-triethoxysilane (A 1100, produced by Nippon Unicar), 130 parts of n-butyl alcohol was added to the above-prepared polyvinyl butyral solution, stirred with a stirrer to thereby prepare a coating liquid for the formation of a layer. This coating liquid was impregnated and coated on the aluminum pipe, thermally dried at 150° C. for 10 minutes to form a 1.0 µm thick undercoat layer.

On the other hand, 3 parts of the chlorogallium phthalocyanine crystal prepared in Example 1 was added to a solution of 3 part of polyvinyl butyral resin (S-lec BM-S, produced by Sekisui Chemicals) dissolved in 100 parts of a mixed solution of xylene/n-butyl acetate (mixing ratio: 1/5), dispersed by a sand mill for 6 hours, and diluted with the above-mentioned xylene/n-butyl acetate mixed solution to prepare a coating solution for the formation of a charge generating layer having a solid concentration of 3.0% by weight. The resulting coating solution was subjected to ring coating on the above-mentioned undercoat layer, thermally dried at 100° C. for 10 minutes to form a 0.20 µm thick charge generating layer.

On the formed charge generating layer was formed a charge transport layer. To be specific, 4 parts of N,N'-bis-(p-tollyl)-N,N'-(p-ethylphenyl)-3,3'-dimethylbenzidine as a charge transport material and 6 parts of polycarbonate Z resin were dissolved in 40 parts of monochlorobenzene, and the resulting solution was coated on the charge generating layer by an impregnating application apparatus, followed by thermally drying at 115° C. for 60 minutes to prepare a 20

μm thick charge transport layer. This gave an electrophotographic photoreceptor.

EXAMPLE 8

An electrophotographic photoreceptor was produced as in Example 7 except for using as a charge generating material the chlorogallium phthalocyanine crystal prepared in Example 2 instead of that in Example 1.

EXAMPLE 9

An electrophotographic photoreceptor was produced as in Example 7 except for using as a charge generating material the chlorogallium phthalocyanine crystal prepared in Example 3 instead of that in Example 1.

EXAMPLE 10

An electrophotographic photoreceptor was produced as in Example 7 except for using as a charge generating material the chlorogallium phthalocyanine crystal prepared in Example 4 instead of that in Example 1.

EXAMPLE 11

An electrophotographic photoreceptor was produced as in Example 7 except for using as a charge generating material the chlorogallium phthalocyanine crystal prepared in Example 5 instead of that in Example 1.

EXAMPLE 12

An electrophotographic photoreceptor was produced as in Example 7 except for using as a charge generating material the chlorogallium phthalocyanine crystal prepared in Example 6 instead of that in Example 1.

the chlorogallium phthalocyanine crystal prepared in Comparative Example 1 instead of that in Example 1.

COMPARATIVE EXAMPLE 5

An electrophotographic photoreceptor was produced as in Example 7 except for using as a charge generating material the chlorogallium phthalocyanine crystal prepared in Comparative Example 2 instead of that in Example 1.

For these electrophotographic photoreceptors, using a laser printer remodeled scanner (XP-11 modified machine, produced by Fuji Xerox), the electric potentials of several parts were measured by a process in which (A) they are charged with a scorotoron charger having a grid applying electric voltage of −600 V at 20° C. and at 50% RH, (B) irradiated with a light of 7.0 ergs/cm² to carry out discharge using a semiconductor laser after 1 minute, and (C) irradiated with a red LED ray to remove the electric charge after 3 minutes. The higher the electric potential ($V_H$) in (A) is, the higher the receiving electric potential of a photosensitive material is, in which case the photosensitive material could take a high contrast. The lower the electric potential ($V_L$) in (B) is, the higher the sensitivity is, and the lower the electric potential ($V_{RP}$) in (C) is, the smaller the residual electric potential is, evaluating that the photoreceptor has less image memory and fogging. Moreover, the electric potentials of several portions were measured after 5000 times repeated charging and exposure. Furthermore, for these electrophotographic photoreceptors, the evaluation of the image quality was carried out at 30° C. and at 85% RH using a laser printer (XP-11, produced by Fuji Xerox). These results are shown in Table 1.

TABLE 1

| Photo-receptor | Charge generating material | Average particle size (μm) | 7.5° half band width | 28.4°/ 7.5° peak intensity ratio | Initial potential (V) | | | 5000 times repeated potential (V) | | | Image quality |
|---|---|---|---|---|---|---|---|---|---|---|---|
| | | | | | Potential A $V_H$ | Potential B $V_L$ | Potential C $V_{RP}$ | Potential A $V_H$ | Potential B $V_L$ | Potential C $V_{RP}$ | |
| Example 7 | Example 1 | 0.14 | 0.62 | 0.46 | −585 | −70 | −30 | −585 | −65 | −30 | Good |
| Example 8 | Example 2 | 0.20 | 0.41 | 0.43 | −590 | −110 | −70 | −585 | −100 | −65 | Good |
| Example 9 | Example 3 | 0.17 | 0.56 | 0.49 | −590 | −90 | −40 | −585 | −85 | −35 | Good |
| Example 10 | Example 4 | 0.14 | 0.62 | 0.46 | −590 | −75 | −30 | −590 | −70 | −30 | Good |
| Example 11 | Example 5 | 0.20 | 0.41 | 0.43 | −590 | −105 | −70 | −590 | −100 | −65 | Good |
| Example 12 | Example 6 | 0.17 | 0.56 | 0.49 | −595 | −90 | −40 | −590 | −90 | −35 | Good |
| Comparative Example 3 | Synthetic Example | 45.0 | — | — | −575 | −200 | −150 | −570 | −190 | −145 | Black spots were generated |
| Comparative Example 4 | Comparative Example 1 | 0.29 | 0.26 | 0.20 | −585 | −145 | −120 | −570 | −130 | −110 | Black spots were generated |
| Comparative Example 5 | Comparative Example 2 | 0.36 | 0.31 | 0.32 | −590 | −165 | −130 | −575 | −150 | −120 | Black spots were generated |

COMPARATIVE EXAMPLE 3

An electrophotographic photoreceptor was produced as in Example 7 except for using as a charge generating material the chlorogallium phthalocyanine crystal prepared in Synthetic Example instead of that in Example 1.

COMPARATIVE EXAMPLE 4

An electrophotographic photoreceptor was produced as in Example 7 except for using as a charge generating material

What is claimed is:

1. A process for producing a chlorogallium phthalocyanine crystal, which comprises mechanically dry-grinding chlorogallium phthalocyanine with a grinding media to produce a crystal-converted chlorogallium phthalocyanine crystal, wherein the weight ratio of said chlorogallium phthalocyanine to said grinding media is from 1/5 to 1/1000.

2. The process as claimed in claim 1, wherein said crystal-converted chlorogallium phthalocyanine crystal has intense diffraction peaks at Bragg angles (2θ±0.2°) of 7.5°, 16.7°, 25.6° and 28.4°, a half width at the peak of the Bragg angle of 7.5° is not less than 0.35, and a peak intensity ratio of the peak of the Bragg angle of 28.4° to that of 7.5° is from 0.4 to 0.7.

3. The process as claimed in claim 1, wherein said chlorogallium phthalocyanine has intense diffraction peaks at Bragg angles (2θ±0.2°) of 11.0°, 13.5° and 27.1°.

4. The process as claimed in claim 1, wherein said crystal-converted chlorogallium phthalocyanine crystal has an average particle size of not more than 0.20 μm.

5. The process as claimed in claim 2, wherein said crystal-converted chlorogallium phthalocyanine crystal has an average particle size of not more than 0.20 μm.

* * * * *